United States Patent [19]
Jacob

[11] 3,963,995
[45] June 15, 1976

[54] NON-RETURN OPTICAL FARADAY EFFECT SYSTEM AND APPLICATION TO A LASER AMPLIFIER

[75] Inventor: Louis Jacob, Bretigny-Sur-Orge, France

[73] Assignee: Compagnie Generale d'Electricite, Paris, France

[22] Filed: Feb. 25, 1975

[21] Appl. No.: 552,900

[30] Foreign Application Priority Data
Mar. 12, 1974 France .............................. 74.08356

[52] U.S. Cl. ............................. 331/94.5 C; 330/4.3; 350/151
[51] Int. Cl.² ............................................. H01S 3/10
[58] Field of Search ............ 331/94.5; 350/150, 151

[56] References Cited
UNITED STATES PATENTS
3,523,718   8/1970   Crow .............................. 331/94.5 C

*Primary Examiner*—William L. Sikes
*Attorney, Agent, or Firm*—Sughrue, Rothwell, Mion, Zinn & Macpeak

[57] ABSTRACT

Non-return optical Faraday device comprising plates made of a material having a Verdet constant, placed in a magnetic field and acting, simultaneously, as a polarizer, an analyzer and a rotator.

2 Claims, 4 Drawing Figures

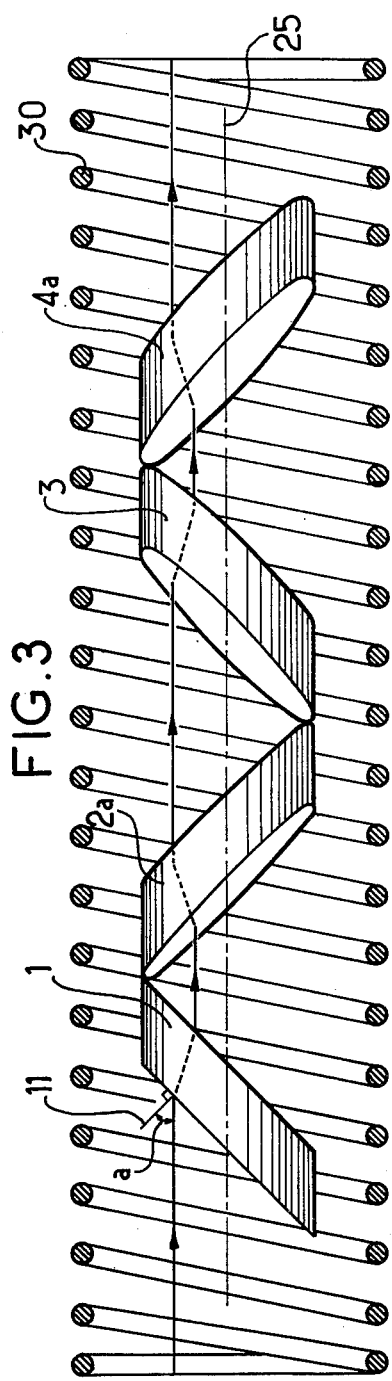
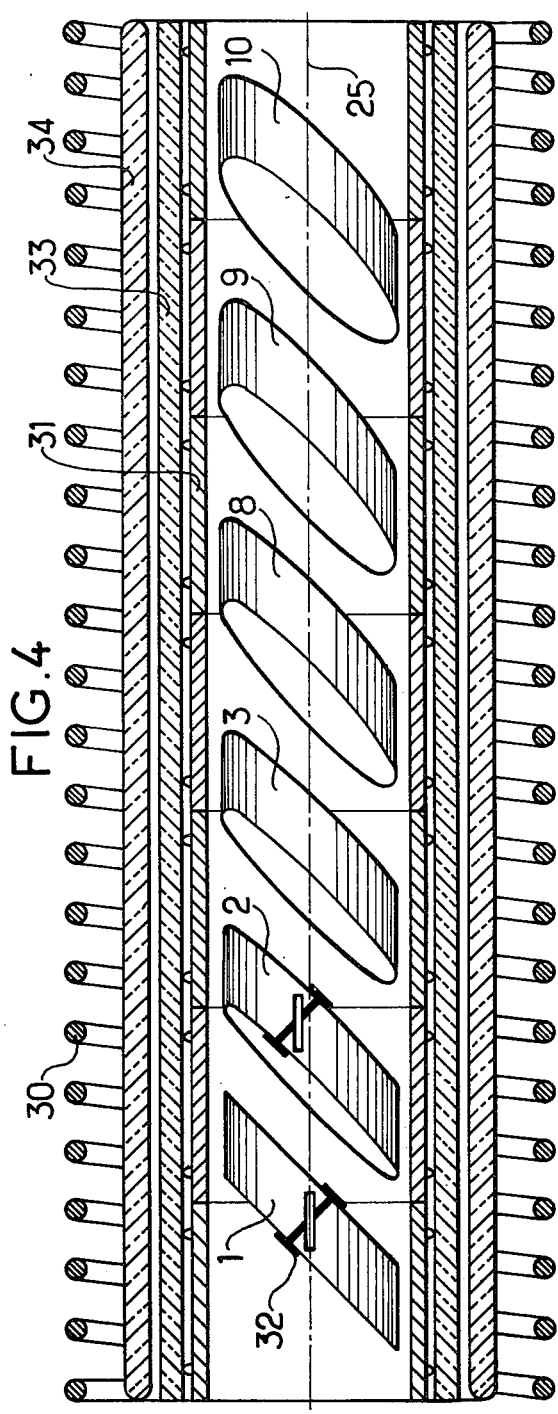

NON-RETURN OPTICAL FARADAY EFFECT SYSTEM AND APPLICATION TO A LASER AMPLIFIER

BACKGROUND OF THE INVENTION

1. Field of the Invention

The invention relates to non-return Faraday effect systems.

2. Description of the Prior Art

Non-return Faraday effect system designates an optical device arranged so that a light beam having crossed it in one direction may not cross it again in the other direction. A known example of such a device is shown diagrammatically in FIG. 1. It comprises, aligned on a same optical axis 1, a polarizer 2, an element 3 making the polarization of a beam rotate, designated hereinafter as a rotator and an analyzer 4.

A non-polarized light beam 10 crosses the polarizer; light polarized in a direction shown by the vector D1 emerges therefrom. The light crosses the rotator, which comprises a bar 3 subjected to a longitudinal magnetic field H; the direction of polarization of the light emerging from the rotator is shown by the vector D2; it has rotated through an angle a proportional to the value of the magnetic field H and to the length of the bar 3 (Faraday effect). That angle a is chosen equal to 45°. The analyzer 4 is set in such a direction that its plane of polarization be parallel to the vector D2. Thus, it allows the light beam emerging from the rotator to pass. If the light beam emerging from the analyzer attempted to pass through again, it would be stopped; indeed, the polarization vector of the returning light may be decomposed into a component perpendicular to D2 and a component parallel to D2. The perpendicular component is stopped by the analyzer 4; the parallel component is stopped by the analyzer, for it undergoes, in the rotator, a rotation of 45° which thus brings it to 90° from the analyzer.

Such a device operates properly. But it should be observed that a device of this kind entails, for the light beam, the crossing of an appreciable thickness of glass (several tens of centimeters).

In a high power glass laser, comprising a generator and several amplifiers, the beam crosses a great length of glass (1 to 3 meters).

It is known that the light beam has a tendency to become self-focussed, more particularly because of the variation in index of the glass due to the presence of intense electric fields.

The longer the portion of glass crossed is, the greater the focussing of the beam is and the more there are risks of damaging the device. That is why it is imperative to try to reduce, as much as possible, the length of glass crossed by the beam.

The applicant has thus sought to produce a non-return device in which the length of glass crossed by the beam is as slight as possible, so as to reduce the self-focussing effect of the beam.

The aim of the invention is therefore to produce a non-return optical device based on the principle set forth above and in which the length of glass crossed by the beam is slight. Another aim of the invention is to combine in a single device such a non-return optical device and a laser amplifier.

The invention has as its object a non-return optical system, characterized in that it comprises a number N of plates having parallel faces made of a material having a Verdet constant and means for applying a magnetic field to the plates as a whole, the first plate of the assembly which receives the incident light beam, being directed, in relation to that beam, so that the angle of incidence be close to the Brewster angle, the planes of the various other plates, each being set in such a direction that on the one hand, the angle of incidence of the beam received on a plate be close to the Brewster angle, and that, on the other hand, the angle between the normal to the plane of that plate and the normal to the plane of the plate situated upstream therefrom, be equal to the angle through which the vector of polarization of the light on crossing the upstream plate has been rotated because of the Faraday effect, and within the number of plates, the material of which they are made, their thickness and the value of the magnetic field being chosen so that the total rotation undergone by the polarization vector of the light between the input of the system and the output be approximtely 45°.

The invention also has as its object a laser amplifier characterized in that it consists of a non-return optical device as described hereinabove, in which the material of the plates is an active material such as glass doped with neodymium, the device being, moreover, provided with a means for exciting the active material, such as a flash.

The invention will be well understood from the description given hereinafter of several examples of embodiment of the invention, with reference to the accompanying drawings.

BRIEF DESCRIPTION OF THE DRAWINGS

FIG. 3 is a perspective diagrammatic view of a non-return optical device according to a variant.

FIG. 4 is a diagrammatic axial cutaway view of a laser amplifier obtained by an adapting of the device in FIG. 2.

DESCRIPTION OF THE PREFERRED EMOBDIMENT

Figure 2:
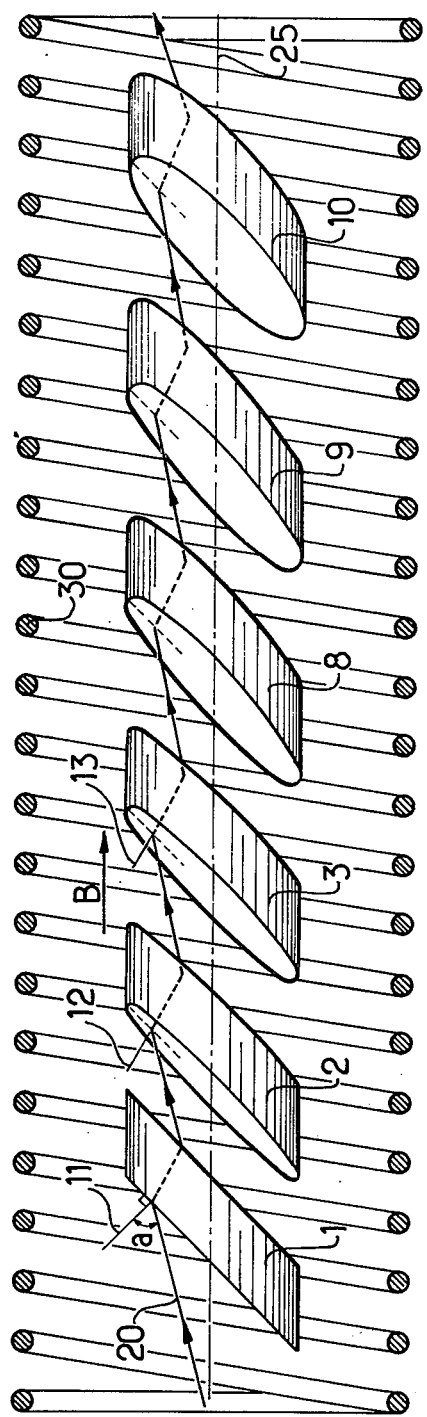
FIG. 2 is a perspective diagrammatic view of a non-return optical device according to a first embodiment.

The non-return device in FIG. 2 comprises several plates such as references 1, 2, 3, . . . , 8, 9, 10, centered on a line 25. A coil 30, through which an electric current I flows surrounds the plates and produces an induction field B. For clearness' sake in the drawing, only six glass plates have been shown, but it must be understood that there are 10 of them.

By way of an example, using a glass having a Verdet constant of 0.0001 degrees/cm.gauss. for the light wavelength used, it will be seen, subsequently that it is sufficient to use 10 glass plates each having a thickness of 1 cm. and to impart to the magnetic field a value producing an induction of 45000 gauss.

The plane of the first plate 1, receiving the incident beam 20, is inclined to that beam by an angle a equal to the Brewster angle of the material of the plate 1. If the plate is made of glass, having an index of 1.5, that angle is equal to 56° 31'.

The normal 11 to the plane of the plate 1 therefore forms an angle a with the beam 20. The second plate 2 is set in a direction such that the incidence of the beam coming from the plate 1 be close to the Brewster angle and that the polarization vector of the light coming from the plate 1 be in the plane of incidence. Now, the crossing of the plate 1 has polarized the beam 10 and makes its vector of polarization rotate through an angle $b = kBe$, where $k$ is the Verdet constant of the material of the plate 1, $B$ is the induction produced by the coil 30 and $e$ is the length of the trajectory covered by the light beam inside the plate 1. If $B = 45000$ gauss, $e = 1$ cm and $k = 10^{-4}$ degrees/gauss.cm, the angle $b$ is equal to 4°, 30', that is to say, the normal 12 to the plane of the plate 2 forms an angle of 4°, 30' with the normal 11 to the plate 1.

The plate 3 will be set in a direction in relation to the plate 2 in such a way that the polarization vector of the light coming from the plate 2 be in the plane of incidence of the plate 3. If the plate 2 has the same thickness as the plate 1 and is made of the same material, the angle of the normal 13 to the plane of the plate 3 will form, with the normal 12, an angle having the value $b$ defined above (4° 30' in the numerical example chosen).

The plates are all set in a direction thus in relation to one another. For the system to operate as a non-return system, the number $n$ of plates, the length $ei$ covered by the beam in the plate $i$, the value $Bi$ of the induction at the lever of the plate $i$, the Verdet constant $ki$ of the material of the plate $i$, must be such that:

the sum from $l$ to $n$ of $(kl.Bi.ei) = 45°$.

Indeed, the return beam may be decomposed into two beams, the one called parallel, having its polarization vector parallel to the polarization vector coming from the plate 10 (at 45° to the perpendicular line 11) and a beam called a perpendicular beam, having its polarization vector at 90° to that of the parallel beams.

The parallel return beam crosses back through the plate 10, but is more and more attenuated on crossing back through the plates 9, 8, 7, etc. since its polarization vector rotates by Faraday effect and moves further and further away from the planes of incidence.

On crossing the last plane 1, it is at 90° to the planes of incidence and is very attenuated.

The perpendicular return beam is very attenuated by the first plate 10 which it encounters and then less and less by the plates 9, 8, 7 . . . etc.

Taking up again the numerical example at the beginning of this description, it will be seen that with an induction of 45000 gauss, ten plates of 1 cm made of a material having a Verdet constant equal to 0.0001 degree/gauss.cm, the total rotation of the polarization vector of the light crossing the system is equal to 45°.

The optical system described in this numerical example is such that the total length is close to 10 cm. A conventional system in the same conditions of material and of value of magnetic induction would require a length of glass of 30 to 40 cm.

Therefore, an appreciable reduction enabling, for equal power of the light beam, the risks of damage or destruction due to self-focussing to be decreased is provided here.

Figure 1:
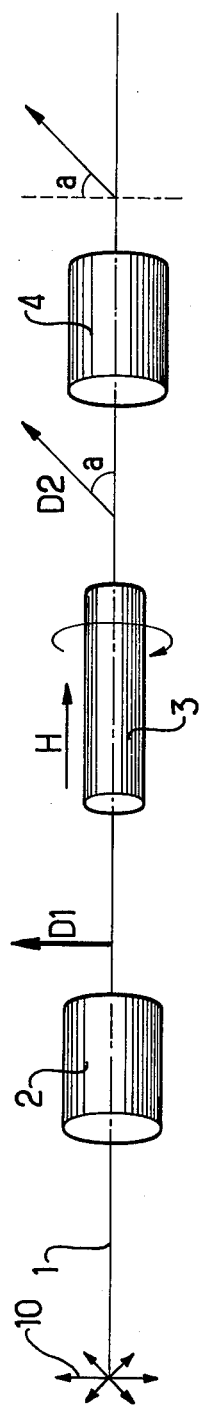
FIG. 1 is a diagrammatic view of a non-return optical device of the Faraday effect type according to the known art.

In the variant according to FIG. 3, the plates are arranged in the same conditions as those in FIG. 1, except that the positions of the plates of even order (2a, 4a, etc.) are deduced from the positions of the plates of even order (2, 4, etc.) in FIG. 2 by a rotation through 90° about the line 25. The reason for that arrangement is as follows:

In the example in FIG. 2, for the light beam 20 to cross all the plates, it must form, at the input of the plate 1, an angle greater than zero with the line 25; indeed, through the action of the successive refractions it has a tendency to move away from the line 25; if it forms too slight an angle with the line 25, it is in danger of not encountering the last plates of the system.

Due to the variant in FIG. 3, the beam may be brought on the plate 1 parallel to the line 25 without being in danger of moving away from that line.

In a high-power laser assembly, a laser generator, several amplifiers and a non-return optical system are successively found.

It has been seen that by replacing the conventional non-return system by the non-return system according to the invention, the length of the glass crossed is reduced by several tens of centimeters.

That length may again be decreased by a length corresponding to the crossing of a laser amplifier making the non-return optical system capable of producing a laser amplification. It is sufficient, for that purpose, to form plates made of an active material, such as glass doped with neodymium and to provide a laser pumping device such as a flash.

FIG. 3 shows an embodiment of such a non-return laser amplifier obtained from the non-return optical device in FIG. 2.

The elements common to FIGS. 2 and 4 bear the same reference numerals. Each plate made of active material is placed in a socket such as 31, into whose notches the clip 32 which surrounds the plate is fitted.

The varous sockets are placed end to end in a tube 33, preferably made of glass, which keeps them in place. A flash 34 which excites the active medium constituted by the plates is placed round the tube 33. The electrical winding 30 is arranged round the flash.

An amplifier could be produced in the same way by fitting up the non-return system in FIG. 3.

An amplifier of the type which has just been described, if it is placed in a high power laser assembly, gives rise to an extra reduction in the length of glass crossed.

What is claimed is:

1. In a non-return optical system, comprising: a number of plates having parallel faces made of a material having a Verdet constant, and means for setting up a magnetic field crossing the faces of these plates with a first plate directed, in relation to a laser beam, such that the angle of incidence be close to the Brewster angle, the improvement wherein: the planes of the various other plates are set in directions such that, on the one hand, the angle of incidence of the laser beam received on each plate is close to the Brewster angle and that, on the other hand, the angle between the normal to the plane of that plate and the normal to the plane of the plate situated upstream thereof is equal to the angle of rotation of the vector of polarization of said laser beam in crossing said upstream plate owing to the Faraday effect, and wherein; the number of plates, the material of which they are made, their thickness and the value of the magnetic field is chosen such that the total rotation angle undergone by the laser beam polarization vector between the input of the system and the output is approximately 45°.

2. In a laser amplifier including a non-return optical device comprising: a number of plates having parallel faces made of a material having a Verdet constant and means for setting up a magnetic field crossing the faces of these plates with a first plate directed, in relation to a laser beam such that the angle of incidence be close to the Brewster angle, the improvement wherein: the planes of the various other plates are set in such directions that, on the one hand, the angle of incidence of the beam received on each plate is close to the Brewster angle and that, on the other hand, the angle between the normal to the plane of that plate and the normal to the plane of the plate situated upstream thereof, be equal to the angle through which the laser beam polarization vector has been rotated owing to the Faraday effect of the laser beam crossing said upstream plate; and wherein, the number of plates, the material of which they are made, their thickness and the value of the magnetic field is such that the total rotation undergone by the polarization vector of the light between the input of the system and the output is approximately 45°; and wherein said plates are made of an active laser material and said system is provided with means for exciting said active material.

* * * * *